US005642537A

United States Patent [19]

Johnson

[11] Patent Number: 5,642,537

[45] Date of Patent: Jul. 1, 1997

[54] PORTABLE PATIENT TRANSFER BOARD

[76] Inventor: David I. Johnson, 1723 Alberta, Little Rock, Ark. 72227

[21] Appl. No.: 566,280

[22] Filed: Dec. 1, 1995

Related U.S. Application Data

[63] Continuation of Ser. No. 429,837, Apr. 27, 1995, abandoned.

[51] Int. Cl.[6] .......... A01C 7/10

[52] U.S. Cl. .......... 5/81.1 HS; 5/507.1; 5/658

[58] Field of Search .......... 5/81.1 R, 81.1 HS, 5/81.1 T, 84.1, 89.1, 503.1, 507.1, 658

[56] References Cited

U.S. PATENT DOCUMENTS

| | | | |
|---|---|---|---|
| 3,329,978 | 7/1967 | Porter et al. | 5/81.1 |
| 3,927,430 | 12/1975 | Allen | 5/81.1 |
| 4,012,799 | 3/1977 | Rutherford | 5/81.1 |
| 4,967,427 | 11/1990 | Cherepy, Sr. | 5/81.1 |
| 5,036,557 | 8/1991 | Fales | 5/81.1 |
| 5,152,016 | 10/1992 | Becker | 5/81.1 |
| 5,213,060 | 5/1993 | Sloan et al. | 5/658 X |

*Primary Examiner*—Michael F. Trettel
*Attorney, Agent, or Firm*—Gary N. Speed, P.A.

[57] ABSTRACT

The present invention is an apparatus designed to ease the transfer of a patient lying flat on a bed or similar flat surface to another bed or similar flat surface. The apparatus includes a low-friction, substantially rigid, planar board which bridges between the beds and has a hinged anchor fin or plurality of such anchor fins on the lower surface that deploy from a folded position parallel to the plane of the board to a fixed position perpendicular to the plane of the board to fit between the beds. Once deployed, the anchor fin or fins prevent the board from sliding with the patient as the patient is moved to the second bed.

2 Claims, 1 Drawing Sheet

PORTABLE PATIENT TRANSFER BOARD

I. CROSS-REFERENCES TO RELATED APPLICATIONS

This application is a continuation of application Ser. No. 08/429,837, filed Apr. 27, 1995, now abandoned.

II. STATEMENT AS TO RIGHTS TO INVENTIONS MADE UNDER FEDERALLY

SPONSORED RESEARCH AND DEVELOPMENT (if any).

None

III. BACKGROUND OF THE INVENTION

A. Field of Invention

The present invention relates to medical aids for bed-ridden patients, and, more particularly, to an apparatus to transfer a patient between beds.

B. Description of the Related Art

Moving patients from one bed to another, moving them from a gurney to a bed and pulling patients up in their beds are common activities in all hospitals. A number of inventions have attempted to solve the problem of performing these functions simply, safely and easily by one hospital attendant without hurting either the patient or the attendant.

U.S. Pat. No. 5,036,557 discloses a patient transfer apparatus that includes a substantially rigid, planar board with a stop or cleat that is used to prevent slippage as the board is used to move a patient up an incline to a second bed of a different height than the first. The stop or cleat is described as a plurality of posts aligned in a linear fashion along the length of the board and attached preferrably by spin-welding. The present invention does not use a plurality of posts, but rather an anchor fin, and has the advantage that once the anchor fin is deployed in a perpendicular position to the plane of the board, it provides a greater anchor to prevent the sliding of the board onto the second bed.

U.S. Pat. No. 4,012,799 discloses a plurality of sled boards for tranferring a patient from one bed to another, but each uses a transverse fin that is molded or formed from the sled board in a fixed position. The present invention has a hinge that allows the transverse fin to fold flat for more compact storage. Further, a single board is used for the patient transfer rather than a plurality.

U.S. Pat. No. 4,067,079 discloses a plastic slab with a plurality of handholes for lifting a patient. This device is not used for direct lifting, although it may be used as an inclined plane for pulling a patient up in his bed after he has slid down.

U.S. Pat. No. 3,329,978 discloses a bridging panel that uses an anti-skid means of plastic or equivalent material with roughed, milled, knurled or otherwise finished surface that depresses against the upper surface of the bed or other soft patient support surface. The current device does not depress or resist skidding by friction on the top surface, but rather by providing an anchor fin that contacts the side of the receiving bed (or other patient support surface).

U.S. Pat. No. 3,927,430 discloses a patient self transporter for the assistance of a patient in moving from a bed to a chair or the like. The device consists generally of a rigid planar surface structure with two down hanging members that fit between the two surfaces. In the present device, the anchor fin is hinged to fold one way so that it will be relatively flat when being carried or stored. In '430, the down hanging members are rigidly attached.

U.S. Pat. No. 3,157,889 discloses a device for transforming two twin beds into one bed comprising a strip of flexible material with a central rib that fits in the gap between the beds. The flexible structure of the device in '889 would not work as well in moving patients between two hospital beds, where the rigid structure of the present device provides more support and a more resistance-free means of transport.

IV. BRIEF SUMMARY OF THE INVENTION

The present invention is an apparatus designed to ease the transfer of a patient lying flat on a bed or similar flat surface to another bed or similar flat surface. The apparatus includes a low-friction, substantially rigid, planar board which bridges between the beds and has a hinged anchor fin on the lower surface that deploys from a folded position parallel to the plane of the board to a position perpendicular to the plane of the board to fit between the beds. Once deployed, the anchor fin prevents the board from sliding with the patient as the patient is moved to the second bed.

One object of the present invention is to provide a simple, compact, lightweight device for the transfer of patients in a prone or supine position from one bed or similar surface or another. A second object of the invention is to provide a simple, compact, light weight device for moving a patient up in a bed after the patient has slid down in the bed.

The invention is designed for safety as well as efficiency. The board is light-weight and may be easily handled by an attendant of moderate size and strength. The low friction surface allows the patient to easily slide across the board as a bridge between the two beds or other surfaces.

These and other objects of the invention will be apparent to those skilled in this art from the following detailed description of a preferred embodiment of the invention.

V. BRIEF DESCRIPTION OF THE DRAWINGS

The invention will be further described in connection with the accompanying drawings, in which.

VI. REFERENCE NUMERALS IN DRAWINGS

Figure 1:
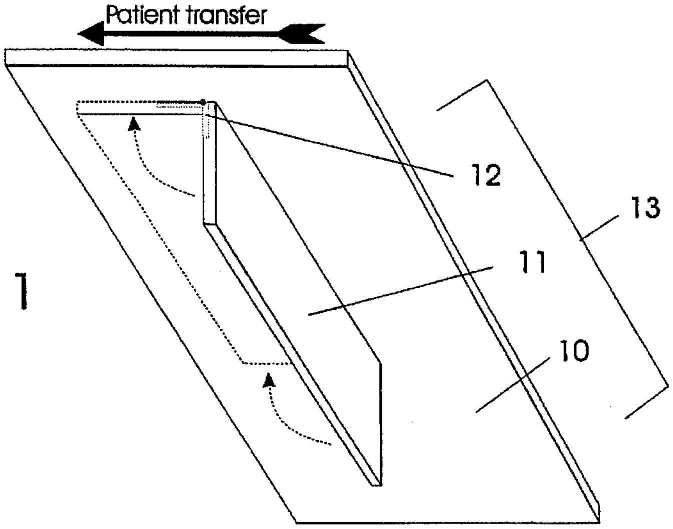
FIG. 1 is a perspective view of a portable patient transfer board in the preferred embodiment.
Figure 2:
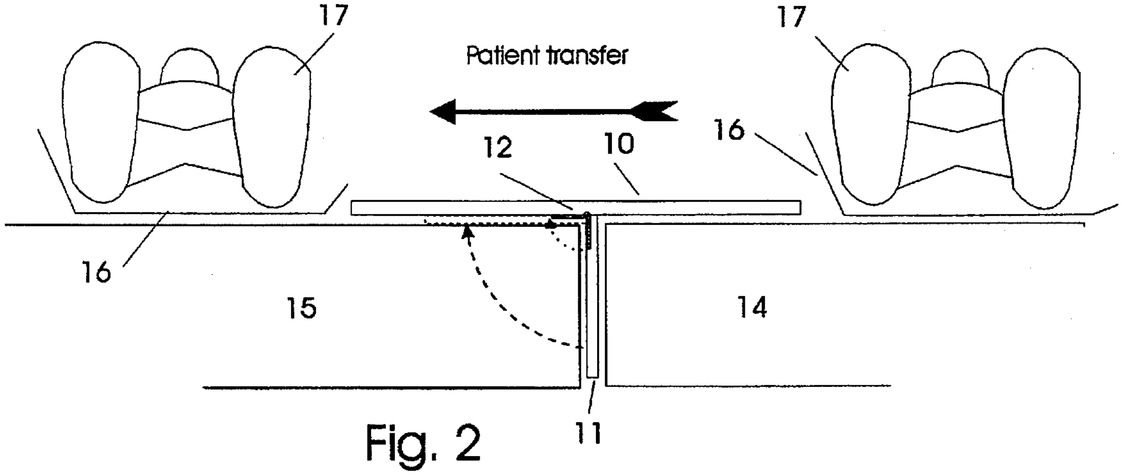
FIG. 2 is a cross sectional view of the portable patient transfer board in the preferred embodiment, showing the device positioned as a bridge between two beds with the anchor fin deployed for patient transfer.
Figure 3:
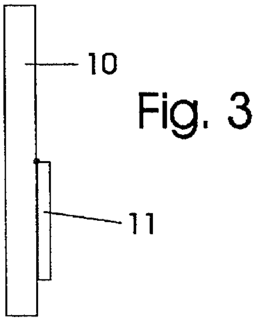
FIG. 3 is a cross sectional view of the portable patient transfer board in the preferred embodiment with the anchor fin folded flat for transport and storage.

The parts identified in the drawings include the following:

10 board;

11 anchor fin;

12 hinge;

13 board assembly

14 bed or other patient support surface;

15 receiving bed or other patient support surface;

16 sheet, and

17 patient.

VII. DETAILED DESCRIPTION/DESCRIPTION OF THE PREFERRED EMBODIMENT

The present invention is a simple, efficient and light-weight device for the transfer of bed-ridden patients from one bed or patient support surface to another that enables a single attendant to move the patient efficiently without overexertion.

The device includes a board (10) with a hard, smooth, relatively frictionless upper surface. The board may be made of fiberglas, plastic, polymer resin, aluminum, steel, wood, composite or equivalent material. The hard, smooth surface may be obtained by surfacing another material with Formica or another equivalent hard, smooth durable material. The board may be a variety of sizes, but should be generally elongated and rectangular. The preferred embodiment is made of 3/16-inch Plexiglas, measuring four feet by one foot.

The anchor fin (11) may be made of the same or similar material as the board (10), but preferrably should be about six inches wide and of any length up to approximately the length of the board (10). The anchor fin (11) may also comprise a plurality of short anchor fins (13) with their rotational axes aligned linearly. The anchor fin (11) is attached to the board (10) by a hinge (12) to form the board assembly (13). The hinge (12) may be metal, plastic or other equivalent material, but preferably should be affixed by countersinking it into the bottom surface of the board (10) and one face of the anchor fin (11). The hinge (12) should be placed so that the edge of the anchor fin (11) abuts the bottom surface of the board (10) so that the anchor fin (11) stops in a perpendicular position to the bottom of the board (10) in one direction and folds down flat against the bottom surface of the board (10) in the other direction.

When the anchor fin (11) is deployed in the perpendicular position, the side of the anchor fin (11) that closes to be adjacent to the bottom of the board (10) should face the side of the receiving bed (15). The anchor fin (11) should be remain rigidly perpendicular to the bottom of the board (10) so long as the anchor fin (11) is held against the side of the receiving bed (15) by the movement of the patient (17) toward the receiving patient bed (15). Movement of the patient (17) in the opposite direction without turning the device around may cause the anchor fin (11) to fold flat, defeating the purpose of the anchor fin (11).

To perform a patient transfer, the patient (17) should be lying on a sheet (16) that is loose from the bed (14). The board (10) should be positioned to bridge the edges of the two beds (14 & 15) with the anchor fin oriented so that the surface that folds flat against the bottom of the board (10) is against the side of the receiving bed (15). If the beds have wheels, all wheels should be locked before the patient (17) is transferred. The patient (17) is transfered by pulling on the sheet (16) across the board (10) toward the receiving bed (14). The board assembly (13) is then removed.

To use the device to pull a patient (17) up in his bed, the fin (11) is folded down flat against the bottom of the board (10). The board assembly (13) is placed next to the patient (17) on a loose sheet (16), and the patient (17) and the sheet (16) are slid or rolled so that the patient (17) is flat on the board (10) on top of the loose sheet (15). The sheet (15) is pulled toward the head of the bed, using the board (10) as a relatively frictionless surface. The board assembly (13) is then removed.

What is claimed is:

1. A portable patient transfer board, comprising an elongated board comprising a top surface and a bottom surface and a rotatable anchor fin attached to the bottom surface of the board by a hinge that allows the fin to be deployed to a fixed position perpendicular to the bottom surface or to fold down to a second position parallel to the bottom surface.

2. A portable patient transfer board, comprising an elongated board comprising a top surface and a bottom surface and a plurality of rotatable anchor fins each with a rotational axis aligned in a linear manner and attached to the bottom surface of the board by a plurality of hinges that allow the fins to be deployed in a fixed position in a plane perpendicular to the bottom surface or to fold down to a second position parallel to the bottom surface.

* * * * *